(12) United States Patent
Kawano et al.

(10) Patent No.: US 11,644,822 B2
(45) Date of Patent: *May 9, 2023

(54) PRODUCTION SYSTEM, PRODUCTION METHOD, AND CONTROL DEVICE

(71) Applicant: MITSUBISHI CHEMICAL ENGINEERING CORPORATION, Tokyo (JP)

(72) Inventors: Kouji Kawano, Tokyo (JP); Akihiro Matsuki, Tokyo (JP)

(73) Assignee: Mitsubishi Chemical Engineering Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/255,741

(22) PCT Filed: Mar. 19, 2019

(86) PCT No.: PCT/JP2019/011588
§ 371 (c)(1),
(2) Date: Dec. 23, 2020

(87) PCT Pub. No.: WO2020/003651
PCT Pub. Date: Jan. 2, 2020

(65) Prior Publication Data
US 2021/0278828 A1     Sep. 9, 2021

(30) Foreign Application Priority Data

Jun. 26, 2018   (JP) .............................. JP2018-121055

(51) Int. Cl.
*G05B 19/418*    (2006.01)
(52) U.S. Cl.
CPC .............. *G05B 19/41875* (2013.01)

(58) Field of Classification Search
None
See application file for complete search history.

(56) References Cited

U.S. PATENT DOCUMENTS

| 5,635,850 | A | * | 6/1997 | Ogura ................ H01L 22/20 714/724 |
| 6,766,283 | B1 | | 7/2004 | Goldman |

(Continued)

FOREIGN PATENT DOCUMENTS

| JP | 2007-157007 | 6/2007 |
| JP | 2009-021348 | 1/2009 |

(Continued)

OTHER PUBLICATIONS

International Search Report issued for PCT/JP2019/011588, dated May 21, 2019.

(Continued)

*Primary Examiner* — Jason Lin
(74) *Attorney, Agent, or Firm* — Knobbe, Martens, Olson & Bear, LLP

(57) ABSTRACT

A production system for producing products from raw materials by a production process with several steps has a number of production facilities that perform the steps and a control device. The control device determines a control target value by referring to information about group combinations specified in accordance with the relative merits of the manufacturing condition routes followed by respective lots during the production process. The relative merits are determined on the basis of quality items of the lots, classified for inter-step combinations of groups, which are classified on the basis of manufacturing conditions at the steps.

9 Claims, 16 Drawing Sheets

(56) References Cited

U.S. PATENT DOCUMENTS

| | | | | |
|---|---|---|---|---|
| 2005/0021303 | A1* | 1/2005 | Matsushita | G11C 29/006 |
| | | | | 702/185 |
| 2006/0259175 | A1* | 11/2006 | Burda | G05B 19/41865 |
| | | | | 700/100 |
| 2010/0191361 | A1 | 7/2010 | McCready | |
| 2011/0276164 | A1* | 11/2011 | Bourg, Jr. | G05B 13/042 |
| | | | | 700/104 |
| 2015/0234379 | A1* | 8/2015 | Vajaria | H01L 22/12 |
| | | | | 700/121 |
| 2018/0056332 | A1* | 3/2018 | Fuchigami | B65G 53/56 |
| 2019/0018397 | A1 | 1/2019 | Shiba et al. | |
| 2019/0129402 | A1 | 5/2019 | Kawano | |
| 2019/0304037 | A1* | 10/2019 | Kawano | G06Q 50/04 |

FOREIGN PATENT DOCUMENTS

| | | |
|---|---|---|
| JP | 2010-015236 A | 1/2010 |
| JP | 2012-515984 | 7/2012 |
| JP | 2016-167205 A | 9/2016 |
| JP | 2016-177794 | 10/2016 |
| JP | 2018-034113 | 3/2018 |
| WO | WO 2017/122340 | 7/2017 |

OTHER PUBLICATIONS

Office Action in counterpart Japanese Application No. 2019-120487, dated May 31, 2022.
Extended European search report dated Feb. 18, 2022 in the counterpart European patent application No. 19824597.9.
Office Action issued in European Application No. 19824597.9, dated Feb. 7, 2023.

* cited by examiner

FIG. 11

| | FIRST STEP | SECOND STEP | THIRD STEP | FOURTH STEP | FIFTH STEP | SIXTH STEP | PRODUCT DATA |
|---|---|---|---|---|---|---|---|
| CASE1 | 1 | 1 | 1 | 1 | 1 | 1 | ACCEPTABLE |
| CASE2 | 1 | 1 | 1 | 1 | 1 | 2 | ACCEPTABLE |
| CASE3 | 1 | 1 | 1 | 1 | 2 | 2 | ACCEPTABLE |
| CASE4 | 2 | 2 | 1 | 2 | 1 | 1 | EXCELLENT |
| CASE5 | 2 | 2 | 1 | 2 | 2 | 1 | EXCELLENT |
| CASE6 | 2 | 2 | 2 | 2 | 1 | 1 | GOOD |
| CASE7 | 2 | 2 | 2 | 2 | 2 | 1 | GOOD |
| CASE8 | 3 | 3 | 2 | 2 | 1 | 1 | GOOD |
| CASE9 | 3 | 3 | 2 | 2 | 1 | 2 | ACCEPTABLE |
| CASE10 | 3 | 3 | 2 | 2 | 2 | 1 | GOOD |
| CASE11 | 3 | 3 | 2 | 2 | 2 | 2 | GOOD |
| CASE12 | 4 | 2 | 3 | 3 | 1 | 2 | EXCELLENT |
| CASE13 | 4 | 2 | 3 | 3 | 2 | 2 | EXCELLENT |
| CASE14 | 5 | 3 | 4 | 2 | 1 | 1 | EXCELLENT |
| CASE15 | 5 | 3 | 4 | 2 | 2 | 1 | GOOD |
| CASE16 | 6 | 4 | 5 | 4 | 3 | 3 | ACCEPTABLE |

*FIG. 14*

| GROUP 1 | RAW MATERIAL A | WATER-SOLUBLE MATTER | ⇒ HIGH |
|---|---|---|---|
| | | ACID-SOLUBLE MATTER | ⇒ HIGH |
| | | IGNITION LOSS | ⇒ HIGH |
| | RAW MATERIAL B | DRYING LOSS | ⇒ HIGH |
| | RAW MATERIAL C | IGNITION RESIDUE | ⇒ LOW |
| GROUP 2 | RAW MATERIAL A | WATER-SOLUBLE MATTER | ⇒ HIGH |
| | | ACID-SOLUBLE MATTER | ⇒ LOW |
| | | IGNITION LOSS | ⇒ LOW |
| | RAW MATERIAL B | DRYING LOSS | ⇒ HIGH |
| | RAW MATERIAL C | IGNITION RESIDUE | ⇒ LOW |
| GROUP 3 | RAW MATERIAL A | WATER-SOLUBLE MATTER | ⇒ LOW |
| | | ACID-SOLUBLE MATTER | ⇒ LOW |
| | | IGNITION LOSS | ⇒ HIGH |
| | RAW MATERIAL B | DRYING LOSS | ⇒ HIGH |
| | RAW MATERIAL C | IGNITION RESIDUE | ⇒ HIGH |
| GROUP 4 | RAW MATERIAL A | WATER-SOLUBLE MATTER | ⇒ HIGH |
| | | ACID-SOLUBLE MATTER | ⇒ HIGH |
| | | IGNITION LOSS | ⇒ HIGH |
| | RAW MATERIAL B | DRYING LOSS | ⇒ HIGH |
| | RAW MATERIAL C | IGNITION RESIDUE | ⇒ LOW |
| | RAW MATERIAL D | IGNITION RESIDUE | ⇒ LOW |

⋮

| GROUP n | RAW MATERIAL A | WATER-SOLUBLE MATTER | ⇒ LOW |
|---|---|---|---|
| | | ACID-SOLUBLE MATTER | ⇒ LOW |
| | | IGNITION LOSS | ⇒ HIGH |
| | RAW MATERIAL B | DRYING LOSS | ⇒ HIGH |

PRODUCTION SYSTEM, PRODUCTION METHOD, AND CONTROL DEVICE

TECHNICAL FIELD

The present invention relates to a production system, a production method, and a control device.

BACKGROUND ART

In the manufacture of medicines and food products, control target values, upper limit values, and lower limit values for various processes are determined in order to maintain product quality. For example, in the manufacture of medicine tablets, control target values are determined for granulators, dryers, and the like, which perform various processes on granulate materials so that tablets, which are final products, have a predetermined solute quality. Such control target values in production processes are determined through a variety of methods (see, for example, PTL 1 to 2).

DOCUMENTS OF PRIOR ARTS

Patent Document

[PTL 1] Japanese Patent Application Publication No. 2009-021348
[PTL 2] Japanese Translation of PCT Application No. 2012-515984

SUMMARY OF THE INVENTION

Problems to be Solved by the Invention

For example, at production sites which handle powder raw materials, devices that handle respectively different steps, such as mixing, granulation, and drying, are prepared and the raw materials (which also include "intermediate products" hereinafter) are moved between the steps continuously by pipes, or moved intermittently by receptacles. Accordingly, the state of the raw materials entering each step is inevitably affected by various factors, such as the details of processing performed in preceding steps and characteristics of the raw materials at the time of shipment from a raw material manufacturer. As such, the control target values for devices handling respective steps may be adjusted dynamically on the basis of experience and projections, rather than being determined uniquely.

However, in a production system that involves a variety of steps, the state of a final product is the result of mutual effects of many processes performed in various steps, and it is therefore not easy to improve the entire process while experimenting with changes in, for example, control target values used in specific steps.

Accordingly, an object of the present invention is to stabilize the quality of a product manufactured through a plurality of steps.

Means for Solving the Problems

In order to solve the above-described problem, the present invention determines a control target value of a production apparatus on the basis of information of a combination of groups specified in accordance with the superiority/inferiority of a route of manufacturing conditions that is followed by each of lots in the past when passing through a production process.

Specifically, the present invention is a production system producing a product from a raw material by a production process having a plurality of steps. The system includes a plurality of production apparatuses that handle the steps, and a control device that determines a control target value set for each of the plurality of production apparatuses. The control device, upon obtaining information of a manufacturing condition indicating a state of at least any step among the plurality of steps, determines a control target value set for at least any of the plurality of production apparatuses by referring to information of a combination of groups specified in accordance with a superiority/inferiority, which is determined on the basis of a quality item of each of lots classified according to each of combinations of steps in a plurality of the groups which have been classified according to each of manufacturing conditions in each of the steps, the superiority/inferiority being a superiority/inferiority of a route of the manufacturing conditions that is followed when each of the lots passes through the production process.

Here, "manufacturing conditions" are a concept that includes various measurement values, control amounts, and other information in the production process, and are not limited to thresholds such as upper limit values and lower limit values, for example. Additionally, "obtaining information" is a concept which is not limited to the control device actively obtaining information, but also includes the control device passively obtaining information, such as when an operator inputs information manually.

According to the above-described production system, a control target value based on past production results is determined on the basis of information of current manufacturing conditions. Accordingly, product quality can be stabilized more than in a case where fixed control target values are set uniformly for each device, regardless of the manufacturing state.

Note that the control device may determine the control target value set for at least any of the plurality of production apparatuses by referring to information of any combination, in which at least a condition of a product quality is satisfied, among the combinations of groups. If the control target value is determined in this manner, a product that satisfies the quality condition can be produced.

Additionally, the control device may set the determined control target value in at least any of the plurality of production apparatuses. If the control target value is set in this manner, for example, the control target value can be changed autonomously in accordance with a change in the manufacturing state.

Additionally, in a state in which the product has been produced in the production process, upon obtaining information of a manufacturing condition indicating a state of at least any step among the plurality of steps, the control device may determine, on the basis of the obtained information, whether or not a lot of the product meets manufacturing conditions of the route. If such a determination is made, the occurrence of lots that do not conform to the manufacturing conditions can be detected.

Additionally, the information of the combination may be, with data that includes a manufacturing condition that indicates a state of each of the steps and a quality item that indicates a quality of the product being collected for each lot in the production process, and the steps being classified into a plurality of groups in accordance with manufacturing conditions of the steps, and moreover the lots being classified into a plurality of routes for each combination of groups, and furthermore a superiority/inferiority of each of the routes being determined in accordance with the quality item of the route, information of a favorable combination of the groups specified in accordance with the superiority/inferiority of each of the routes. With the information of the combination created in this manner, the control target values can be determined according to a route where the superiority/inferiority of the product quality is known from past production results.

Additionally, the production process may be a continuous production process that continuously produces a product from a powder, which is a raw material. The plurality of production apparatuses may include a first processing device that performs first processing on the powder, which is a raw material, a second processing device that performs second processing on the powder, on which the first processing device has performed the first processing, and an inspection and sorting device having an inspection chamber, into which the powder sent from the first processing device flows. The inspection and sorting device may be a device that, when a prescribed amount of the powder has accumulated in the inspection chamber, inspects the powder inside the inspection chamber after blocking a path connecting the first processing device to the inspection chamber, and when the inspection ends, discharges the powder from within the inspection chamber and then cancels the blocking. When the inspection and sorting device obtains information of a property of the powder within the inspection chamber, the control device may determine a control target value set in the second processing device by referring to the information of the combination. With such a production system, even when continuously producing a product from a powder raw material, for example, information of the properties of the powder can be obtained accurately, which makes it possible to appropriately determine the control target value based on past production results.

Additionally, in a case where the powder within the inspection chamber is not classified into any of the groups as a result of referring to the information of the combination, the control device may avoid causing the inspection and sorting device to discharge the powder from within the inspection chamber to the second processing device. With such a production system, a lot which has deviated from a route can be prevented from being sent to the second processing device.

The present invention can be realized as a method aspect as well. For example, the present invention may be a production method for producing a product from a raw material by a production process having a plurality of steps. The method includes a step of operating a plurality of production apparatuses that handle the steps, and a step of causing a control device to determine a control target value set for each of the plurality of production apparatuses. The step of causing the control device to make determination, upon obtaining information of a manufacturing condition indicating a state of at least any step among the plurality of steps, determines a control target value set for at least any of the plurality of production apparatuses by referring to information of a combination of groups specified in accordance with a superiority/inferiority, which is determined on the basis of a quality item of each of lots classified according to each of combinations of steps in a plurality of the groups which have been classified according to each of the manufacturing conditions in each of the steps, the superiority/inferiority being a superiority/inferiority of a route of manufacturing conditions that is followed when each of the lots passes through the production process.

The present invention can be realized as a control device aspect as well. For example, the present invention may be a control device of a production system producing a product from a raw material by a production process having a plurality of steps. The control device includes a processing unit that executes processing of determining a control target value set for each of a plurality of production apparatuses that handle the steps, and an output unit that outputs the control target value determined by the processing unit. The processing unit, upon obtaining information of a manufacturing condition indicating a state of at least one step among the plurality of steps, determines a control target value set for at least any of the plurality of production apparatuses by referring to information of a combination of groups specified in accordance with a superiority/inferiority, which is determined on the basis of a quality item of each of lots classified according to each of combinations of steps in a plurality of the groups which have been classified according to each of the manufacturing conditions in each of the steps, the superiority/inferiority being a superiority/inferiority of a route of manufacturing conditions that is followed when each of the lots passes through the production process.

Effects of the Invention

According to the production system, production method, and control device described above, the quality of a product manufactured through a plurality of steps can be stabilized.

BRIEF DESCRIPTION OF THE DRAWINGS

FIG. 11 is a table showing a combination of groups and product data for each of steps.

FIG. 14 is a diagram illustrating an example of raw materials classified into a plurality of groups by properties.

DETAILED DESCRIPTION OF AN EMBODIMENT

An embodiment will be described hereinafter. The embodiment described hereinafter is merely an example, and the technical scope of the present disclosure is not intended to be limited to the following embodiment.
<Hardware Configuration>

Figure 1:
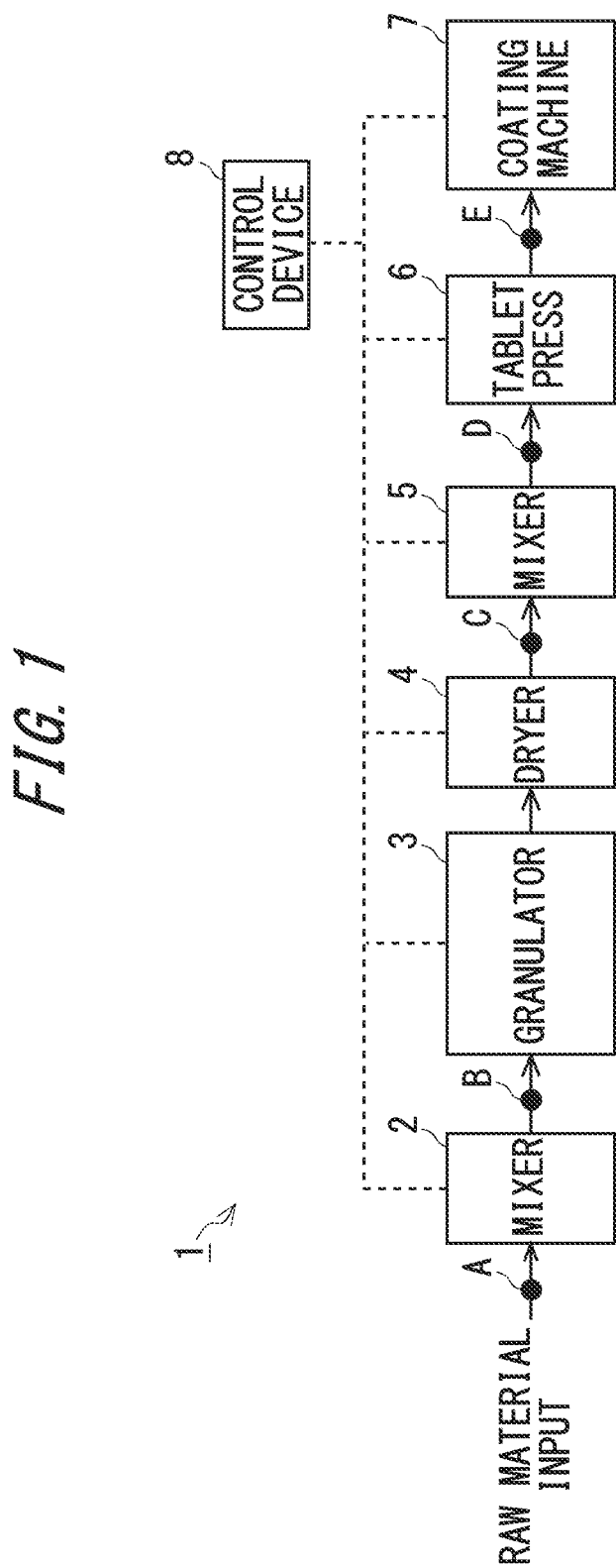
FIG. 1 is a diagram illustrating a continuous production system according to an embodiment.

FIG. 1 is a diagram illustrating a continuous production system 1 according to the embodiment. Although the present embodiment will describe a case where a product is continuously produced from a powder of a raw material as an example, the present embodiment can also be applied to a batch system in which the raw material is intermittently moved between devices that handle each step using a receptacle or the like. Additionally, although the present embodiment will describe producing a medicine as an example, the present embodiment can also be applied in the production of food products and other types of products, for example. Furthermore, although the present embodiment will describe a case of the continuous production of a product from a powder as an example, the present embodiment can also be applied, for example, to the case of the continuous production of a product from a raw material including a substance other than a powder or a raw material aside from a powder.

The continuous production system 1 is a system that produces tablets from a powder raw material, and as illustrated in FIG. 1, includes a mixer 2, a granulator 3, a dryer 4, a mixer 5, a tablet press 6, and a coating machine 7, as well as a control device 8 that controls the stated elements. The mixer 2 includes an input port into which the powder raw material is input, and mixes various types of powders, liquids, and the like serving as the raw materials for the tablets. The granulator 3 granulates the raw materials mixed by the mixer 2 by causing those raw materials to bind together into small particle groups. The dryer 4 adds various types of additional raw materials to the raw materials granulated by the granulator 3 and dries the raw materials. The mixer 5 mixes the granular raw materials dried by the dryer 4. The tablet press 6 creates tablets from the granular raw materials mixed by the mixer 5 by pressurizing those raw materials in a mold. The coating machine 7 applies a coating to the tablets solidified by the tablet press 6. In the continuous production system 1, the series of equipment, from the mixer 2 to the coating machine 7, are connected. Accordingly, with the continuous production system 1, a variety of types of processing performed by each piece of equipment in the series from the mixer 2 to the coating machine 7 can be performed continuously on the raw materials input to the mixer 2.

Although FIG. 1 illustrates one each of the devices in the series from the mixer 2 to the coating machine 7, the continuous production system 1 is not limited to this form. For example, one or more of the mixer 2, the granulator 3, and the dryer 4 may be prepared, and a plurality of types of raw materials may be mixed in the mixer 5.

The series of equipment from the mixer 2 to the coating machine 7 is controlled by the control device 8. The control device 8 includes a CPU (Central Processing Unit) (an example of a "processing unit" according to the present application), which handles various types of computational processing, memory, an input/output interface (an example of an "output unit" according to the present application), and the like, and on the basis of information of manufacturing conditions in each step of a production process implemented by the continuous production system 1, determines control target values for the mixer 2, the granulator 3, the dryer 4, the mixer 5, the tablet press 6, and the coating machine 7. For example, values obtained from the various devices among the mixer 2 to the coating machine 7, such as a rotational speed of a screw feeder provided in the mixer 2 and a temperature of the dryer 4, as well as values obtained from sensors provided partway along paths connecting the devices, are included as the measurement values to which the control device 8 refers. Positions such as those indicated by the letters A to E in FIG. 1 can be given as examples of the positions where the sensors are provided partway along the paths connecting the devices. If a sensor is installed at the letter C, which is partway along the path connecting the dryer 4 and the mixer 5, the control device 8 can change operation amounts of the granulator 3, the mixer 5, and so on in accordance with the properties of the raw material which has exited the dryer 4, for example. Additionally, if a sensor is installed at the letter B, which is partway along the path connecting the mixer 2 and the granulator 3, the control device 8 can change the destination of the raw material which has exited the mixer to a destination aside from the granulator 3 in accordance with the properties of that raw material, for example.

Figure 2:
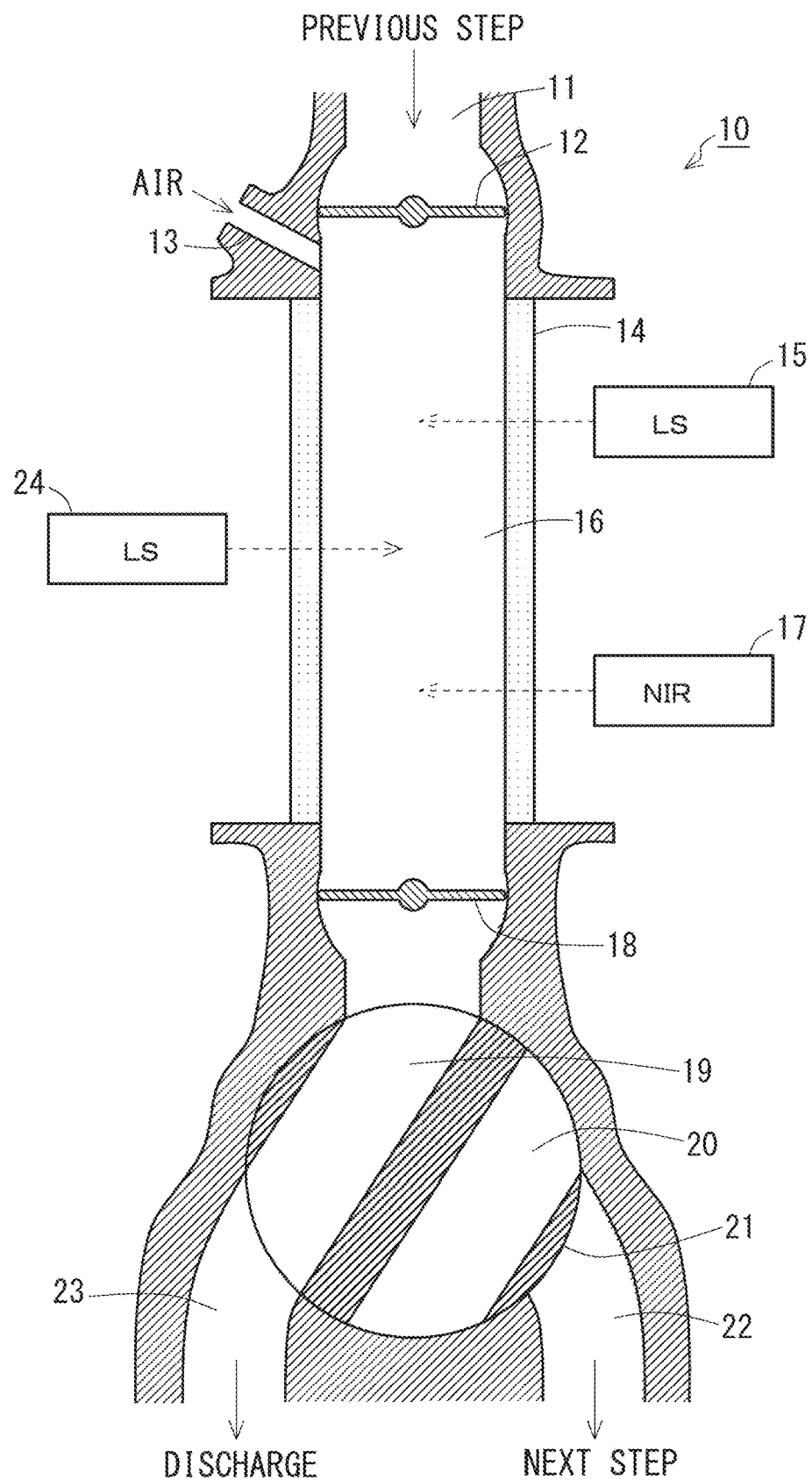
FIG. 2 is a diagram illustrating an example of an inspection and sorting device provided in the continuous production system.

FIG. 2 is a diagram illustrating an example of an inspection and sorting device 10 provided in the continuous production system 1. The inspection and sorting device 10 can be provided at any suitable location in the continuous production system 1. The inspection and sorting device 10 is provided partway along the paths connecting the various devices, from the mixer 2 to the coating machine 7, as indicated by the letters A to E in FIG. 1, for example.

Note that the sensors in the continuous production system 1 are not limited to the locations indicated by the letters A to E in FIG. 1, and are also provided, for example, in each of devices constituting the continuous production system 1. The control device 8 then obtains, from the sensors provided at various locations in this manner, a raw material input amount, a flow rate, temperatures within devices which perform various types of processing such as heating, agitation speeds, and many other measurement values.

The inspection and sorting device 10 includes: an inflow path 11 into which a raw material sent from a device connected to an upstream side of the inspection and sorting device 10 flows; an entry-side sluice valve 12 provided on a lower end of the inflow path 11; an inspection chamber 16 formed below the entry-side sluice valve 12; an air blowing channel 13 provided near the entry-side sluice valve 12; a sight glass 14 which constitutes a wall surface of the inspection chamber 16 and enables the inside of the inspection chamber 16 to be seen from the periphery; and an exit-side sluice valve 18 provided at a lower part of the sight glass 14. Laser sensors 15 and 24 and a spectral analyzer 17, which take optical measurements of the inside of the inspection chamber 16 through the sight glass 14, are provided in the periphery of the inspection chamber 16. In the inspection and sorting device 10, when a raw material is sent from the device connected to the upstream side of the inspection and sorting device 10 while the entry-side sluice valve 12 is in an open state and the exit-side sluice valve 18 is in a closed state, that raw material accumulates in the inspection chamber 16. Once the laser sensor 15 senses that a prescribed amount of the raw material has accumulated in the inspection chamber 16, the entry-side sluice valve 12 closes, and the raw material is inspected using the spectral analyzer 17. A path changeover valve 21 having valve holes 19 and 20 is provided below the exit-side sluice valve 18, and the inspected raw material is sent to an outflow path 22 or an outflow path 23 depending on the inspection result. Whether or not there is any raw material remaining in the inspection chamber 16 is then inspected by the laser sensor 24. Although the present embodiment describes an example in which a near-infrared sensor is used as the spectral analyzer 17, it should be noted that the continuous production system disclosed in the present application is not limited thereto. Additionally, although the present embodiment describes a so-called "diverter valve" as an example of the path changeover valve 21, the continuous production system disclosed in the present application is not limited thereto, and a path changeover mechanism using a different system may be used instead.

Figure 3:
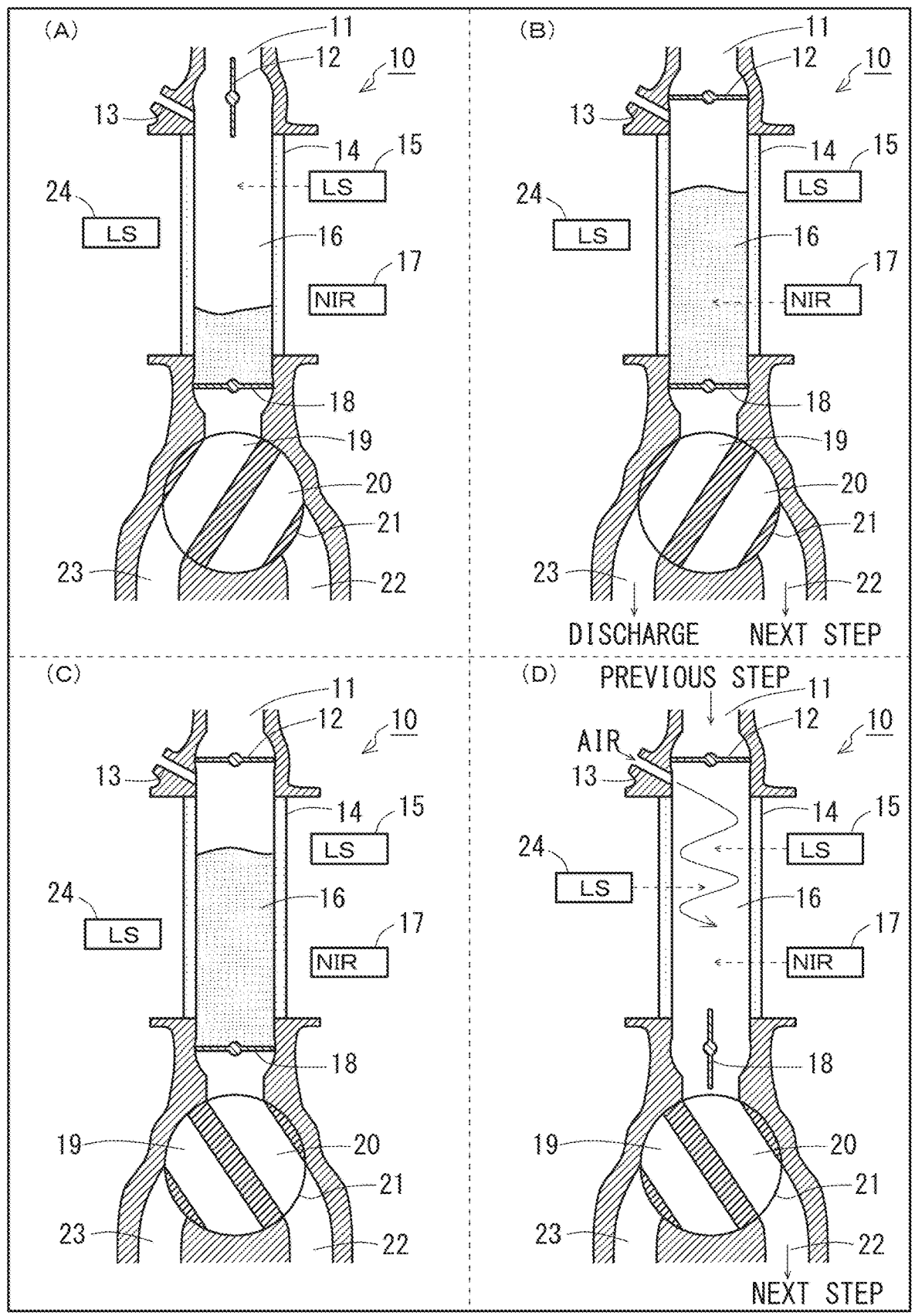
FIG. 3 is a diagram illustrating operations of the inspection and sorting device.

FIG. 3 is a diagram illustrating operations of the inspection and sorting device 10. The inspection and sorting device 10 is connected to the control device 8 of the continuous production system 1. The inspection and sorting device 10 operates in the following manner in accordance with control signals sent from the control device 8 of the continuous production system 1. That is, in the inspection and sorting device 10, when a raw material is sent from the device connected to the upstream side of the inspection and sorting device 10 while the entry-side sluice valve 12 is in an open state and the exit-side sluice valve 18 is in a closed state, that raw material accumulates inside the inspection chamber 16, as illustrated in FIG. 3(A). Then, when the laser sensor 15 has sensed that the raw material accumulating inside the inspection chamber 16 has reached a prescribed height, the entry-side sluice valve 12 closes, as illustrated in FIG. 3(B). Once the entry-side sluice valve 12 closes, the flow of new raw material from the inflow path 11 into the inspection chamber 16 stops. The bulk density of the raw material inside the inspection chamber 16 is kept constant while the flow of new raw material from the inflow path 11 into the inspection chamber 16 is stopped. Accordingly, the inspection of the raw material inside the inspection chamber 16 using the spectral analyzer 17 is started after the entry-side sluice valve 12 has been closed. Performing the inspection using the spectral analyzer 17 with the entry-side sluice valve 12 in a closed state ensures that no changes will arise in the bulk density of the raw material due to an increase in the height of the raw material accumulating inside the inspection chamber 16, and thus stable inspection results can be obtained.

After the inspection of the raw material accumulated inside the inspection chamber 16 is complete, an operation for changing over the path changeover valve 21 is performed in accordance with the inspection result. If, for example, the inspection result of the raw material accumulated inside the inspection chamber 16 indicates no defects, the direction of the path changeover valve 21 changes so that the outflow path 22, which is connected to the device which handles the next process to be performed on the raw material accumulated inside the inspection chamber 16, communicates with the valve hole 20, as illustrated in FIG. 3(C). On the other hand, if, for example, the inspection result of the raw material accumulated inside the inspection chamber 16 indicates a defect, the direction of the path changeover valve 21 changes so that the outflow path 23, which is for discarding the raw material accumulated inside the inspection chamber 16, communicates with the valve hole 19. After the changeover operation by the path changeover valve 21 is complete, the exit-side sluice valve 18 opens, and at the same time as, or a set amount of time after, the exit-side sluice valve 18 opening, air begins being blown into the inspection chamber 16 from the air blowing channel 13, which quickly discharges the raw material which was inside the inspection chamber 16 from the interior of the inspection chamber 16, as illustrated in FIG. 3(D). After the discharge of the raw material is complete, the blowing of air into the inspection chamber 16 from the air blowing channel 13 is stopped, and at the same time, the exit-side sluice valve is closed; an optical inspection for remaining raw material is performed using the laser sensor 24, and the entry-side sluice valve 12 is opened again after the effect of the cleaning has been confirmed. When the entry-side sluice valve 12 opens, raw material which had been sent from the device on the upstream side of the inspection and sorting device 10 and which had accumulated above the entry-side sluice valve 12 while the entry-side sluice valve 12 was closed, flows into the inspection chamber 16.

The inspection and sorting device 10 performs the series of operations described with reference to FIGS. 3(A) to 3(D) repeatedly, every several tens of seconds to every several minutes. Accordingly, there is almost no chance that the inspection and sorting device 10 will pose a substantial obstruction to the continuous operations of the devices connected on the upstream side and the downstream side thereof. Furthermore, the inspection of the raw material using the spectral analyzer 17 is performed with the raw material at a prescribed height sensed by the laser sensor 15 and with the entry-side sluice valve 12 in a closed state, and thus the inspection is performed with the bulk density of the raw material in a constant state each time. As such, there is also almost no chance of the measurement values of the spectral analyzer 17 varying depending on the bulk density of the powder. Accordingly, with an inspection that uses the inspection and sorting device 10, measurement values which vary depending on the bulk density of a powder can be obtained accurately even in the continuous production system 1, which continuously produces tablets from a powder raw material. Furthermore, with the inspection and sorting device 10, all of the raw materials handled continuously by the continuous production system 1 can be inspected by the inspection chamber 16 and sorted by the path changeover valve 21, and thus even if a defective product has arisen in the continuous production system 1 temporarily, non-defective and defective products can be separated in units equivalent to the amount which accumulates inside the inspection chamber 16, making it possible to reduce discarded raw materials to the greatest extent possible.

<Processing Flow>

The details of operations by the continuous production system 1, implemented by the control device 8, will be described next. The following descriptions of the operation details are broadly divided into two main categories: details of a preparation stage, and details of a main operation stage. In the preparation stage, basic information to be used when the control device 8 determines the control target values for each device is prepared on the basis of information of the manufacturing conditions indicating the state of each of steps observed when each equipment of the continuous production system 1 is operated. In the main operation stage, the control device 8 determines the control target values for each device on the basis of the basic information obtained in the preparation stage. The control target values determined by the control device 8 may be set for each device automatically through control communication paths connecting the control device 8 with each of the devices, or may be set manually in each of the devices by an operator.

<Preparation Stage>

Figure 4:
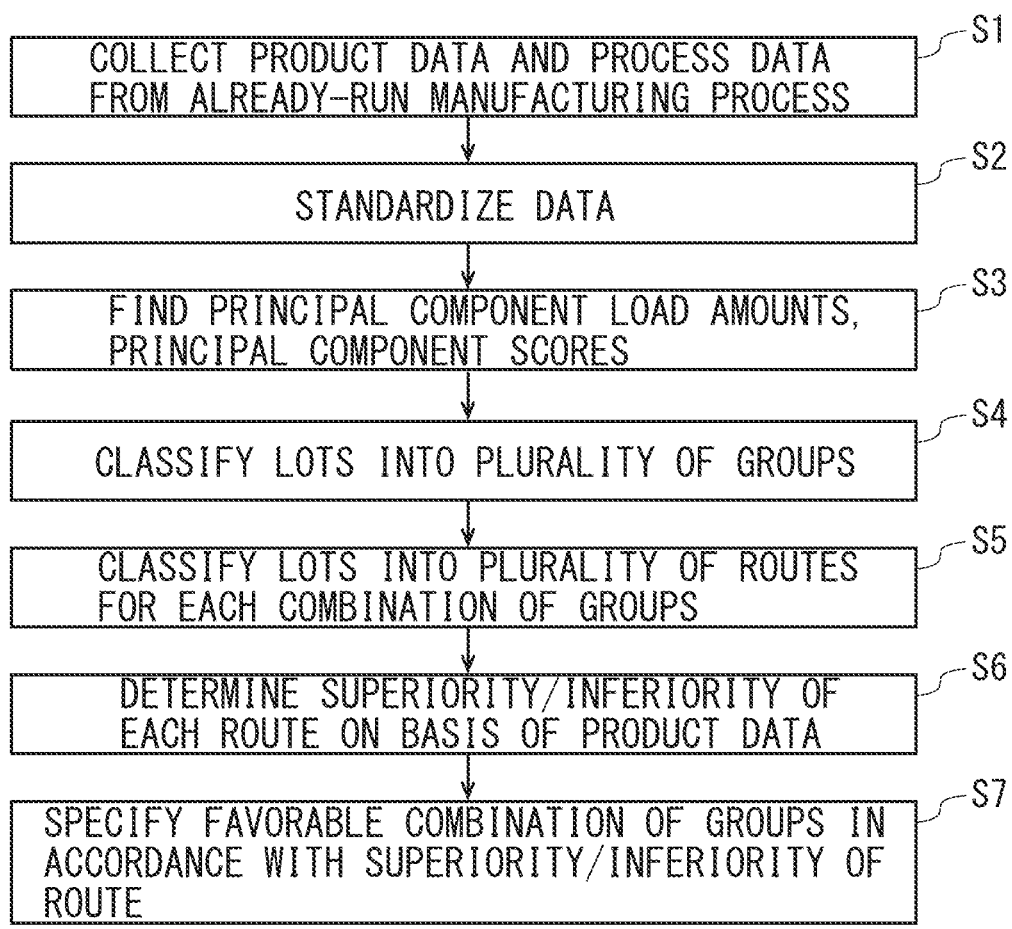
FIG. 4 is a flowchart illustrating a sequence of an analysis method in a production process according to the embodiment.

FIG. 4 is a flowchart illustrating a sequence of an analysis method in a production process according to the present embodiment.

First, the control device 8 collects information of manufacturing conditions measured by the sensors (process data and product data) for a production process which has already been run (step S1). In this step S1, the process data and the product data for each of lots are stored in the control device 8.

Next, the process data and product data collected in step S1 are standardized and converted into intermediate variables (step S2).

The data standardization processing performed in step S2 is known, and to be more specific, is computed by the control device 8 on the basis of Equation 1.

[Math. 1]
$$Z = \frac{x - \mu}{\sigma} \tag{1}$$

($\chi$: Data, $\mu$: Average value, $\sigma$: standard deviation)

Next, principal component load amounts and principal component scores are found on the basis of the intermediate variables obtained in step S2 (step S3). In step S3, a correlation coefficient matrix is first created for the intermediate variables, and eigenvalues and eigenvectors of the correlation coefficient matrix are then derived. A first principal component PC1 is represented by Equation 2 when the intermediate variables in the correlation coefficient matrix are x1, x2, x3, and so on. An Nth principal component PCn is expressed by Equation 3. Then, the correlation coefficient matrix is formed by using coefficients a11, a12, a13, and so on as elements in a first row and coefficients an1, an2, an3, and so on as elements in an nth row.

[Math. 2]
$$PC1 = a_{11} \times x_1 + a_{12} \times x_2 + a_{13} \times x_3 + \cdots \tag{2}$$

[Math. 3]
$$PCn = a_{n1} \times x_1 + a_{n2} \times x_2 + a_{n3} \times x_3 + \cdots \tag{3}$$

Next, the principal component scores are found from the eigenvectors in the correlation coefficient matrix. The percent contribution of each principal component is also calculated from the eigenvalues in the correlation coefficient matrix. The percent contribution of a principal component is obtained by dividing its eigenvalue by the sum of the eigenvalues. Here, the first principal component, a second principal component, and so on up to the Nth principal component are determined starting with the component having the highest eigenvalue.

Figure 5:
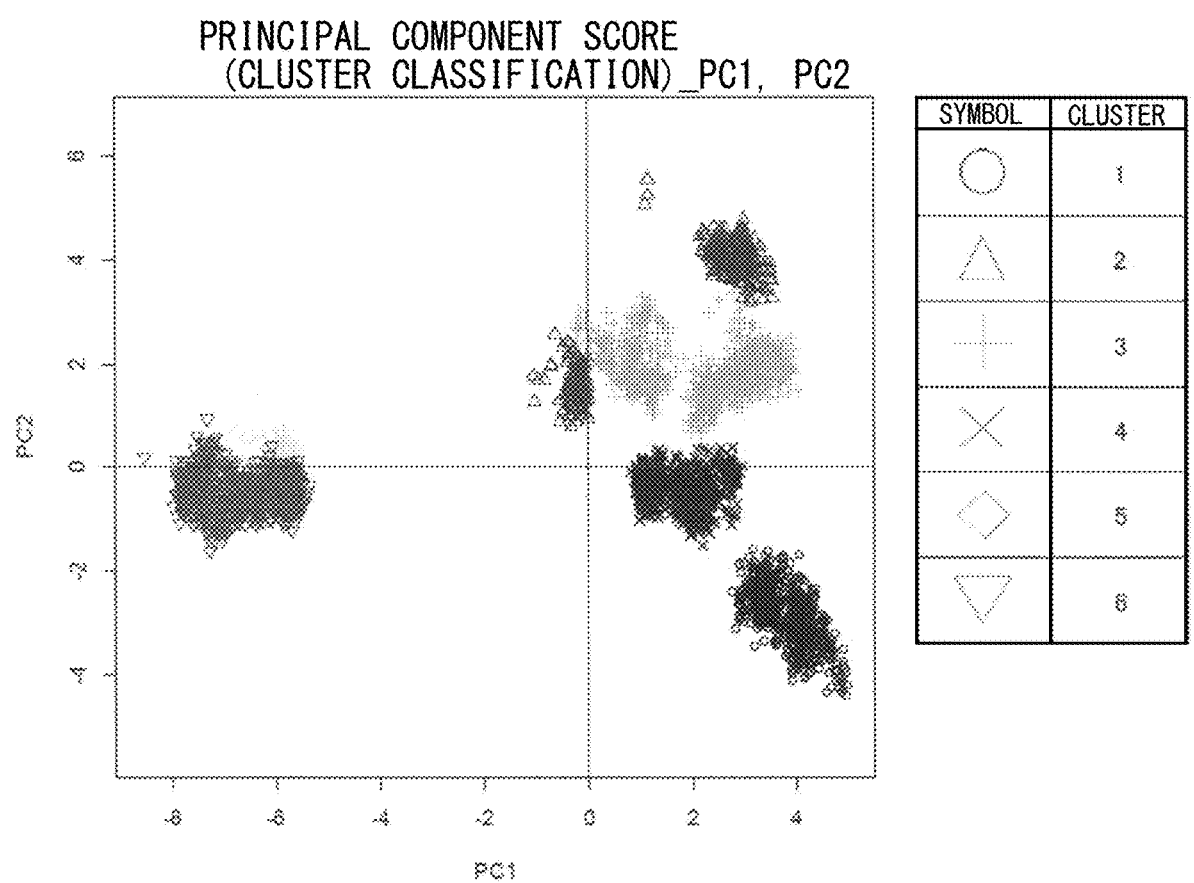
FIG. 5 is a graph showing principal component scores and groups for each of lots in a first step.
Figure 6:
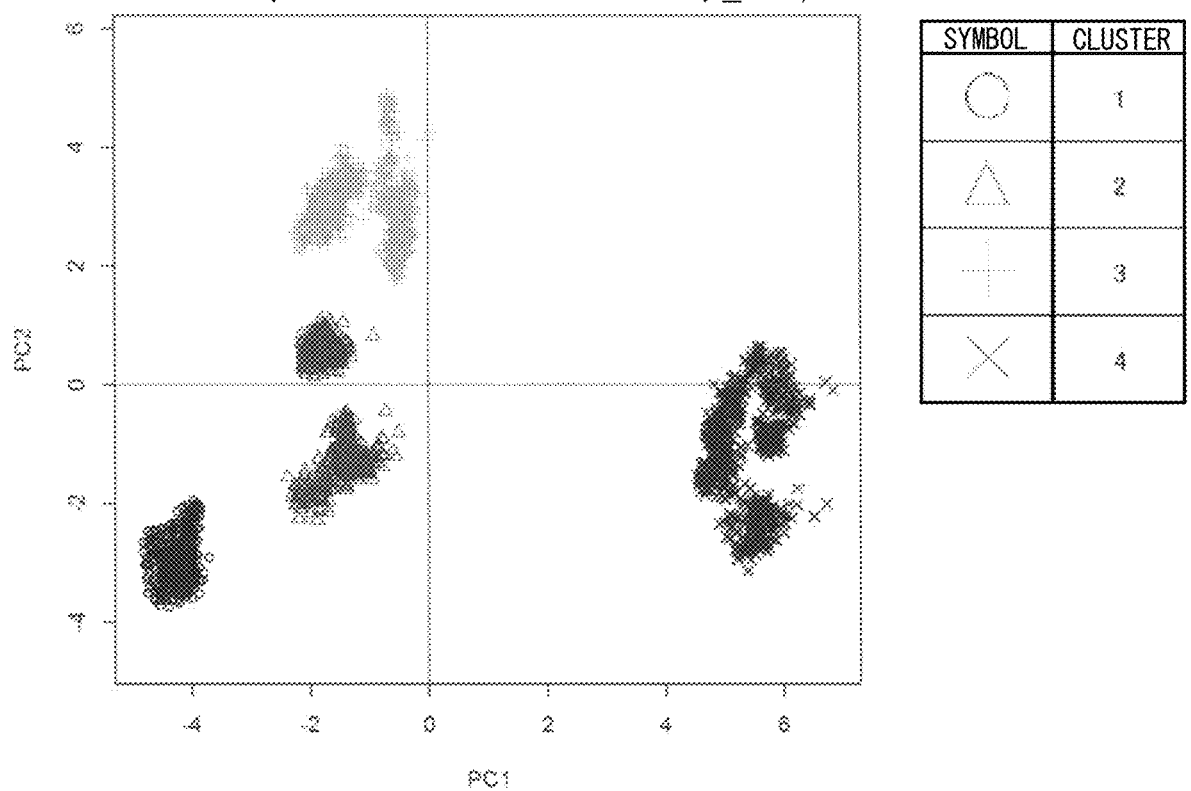
FIG. 6 is a graph showing principal component scores and groups for each of lots in a second step.
Figure 7:
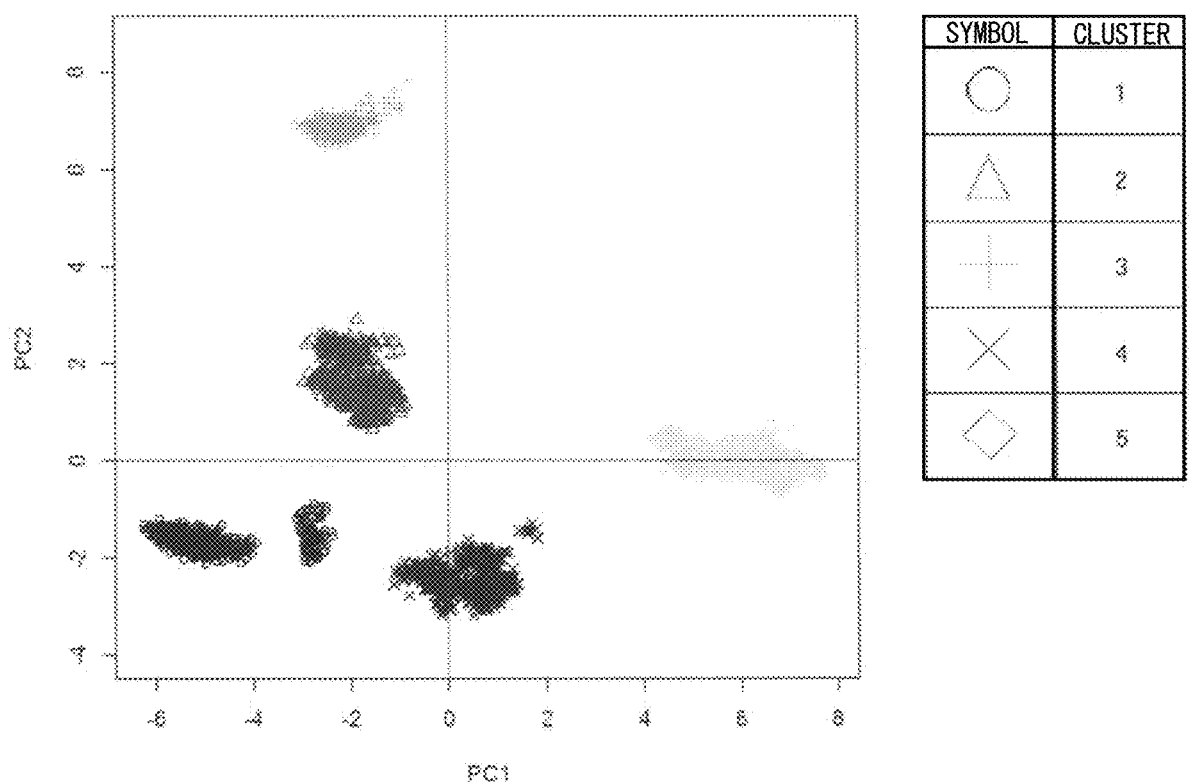
FIG. 7 is a graph showing principal component scores and groups for each of lots in a third step.
Figure 8:
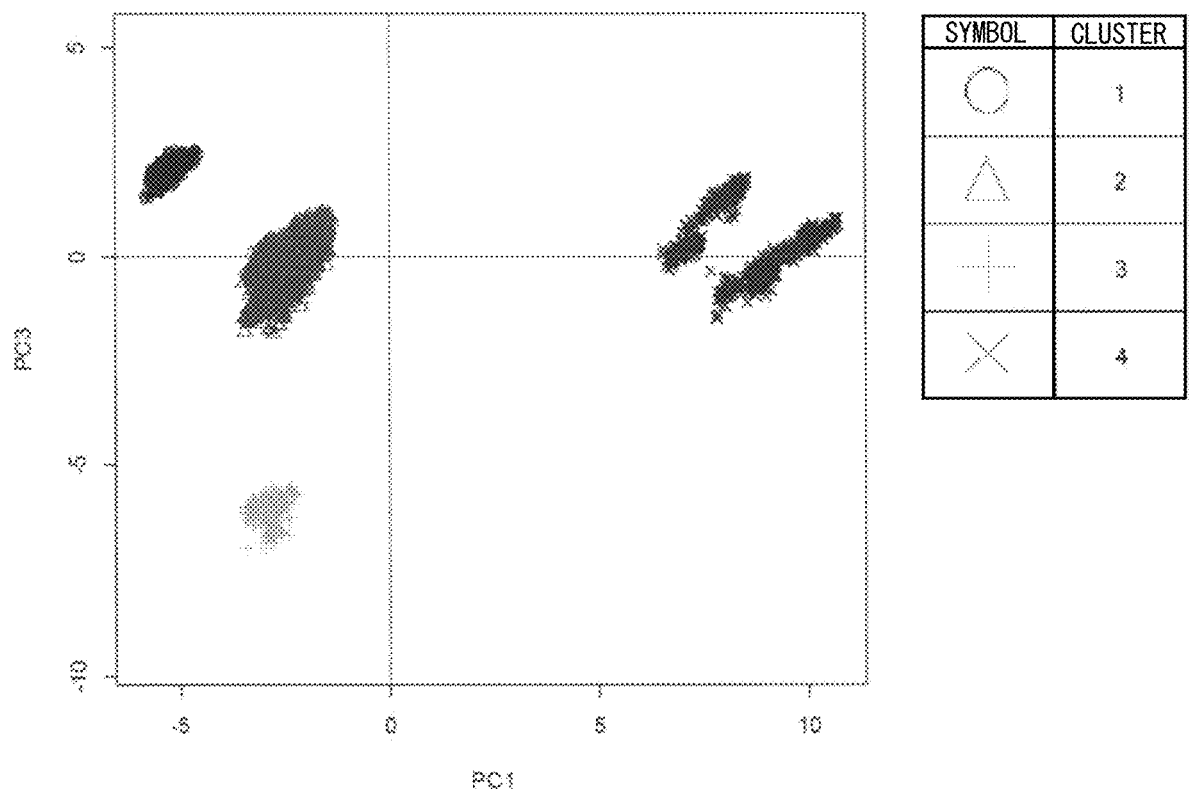
FIG. 8 is a graph showing principal component scores and groups for each of lots in a fourth step.
Figure 9:
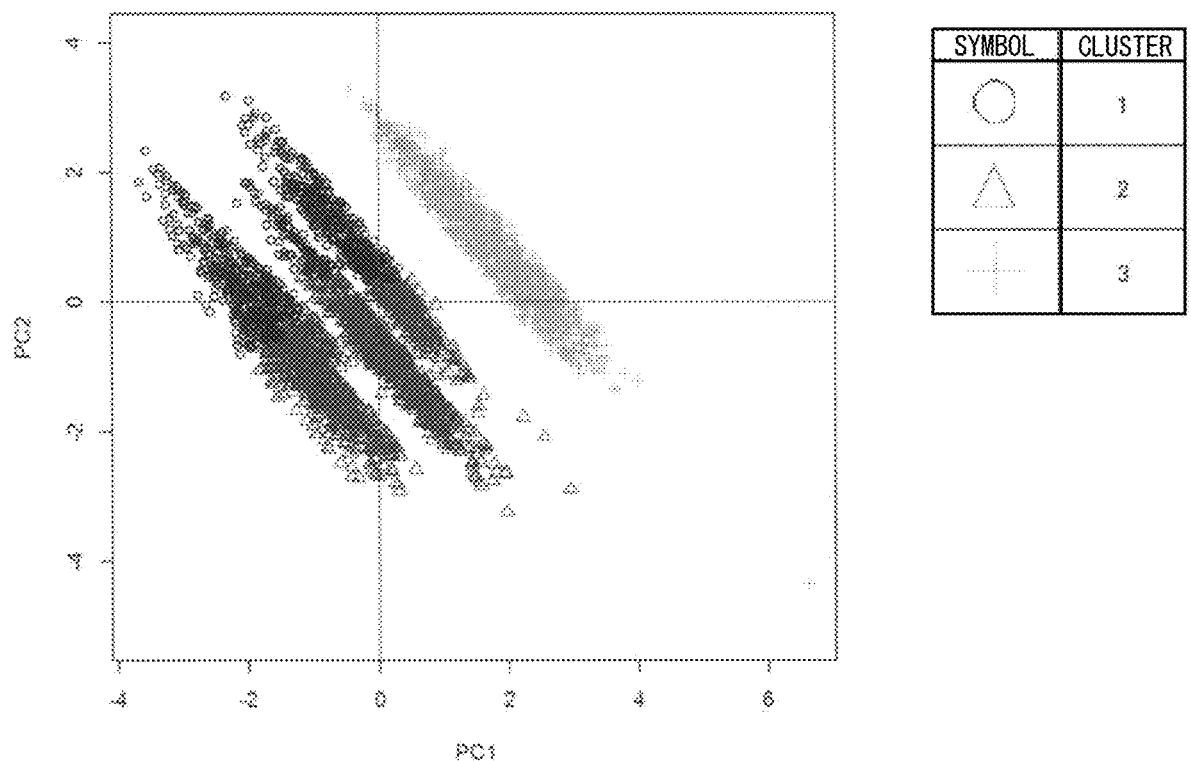
FIG. 9 is a graph showing principal component scores and groups for each of lots in a fifth step.
Figure 10:
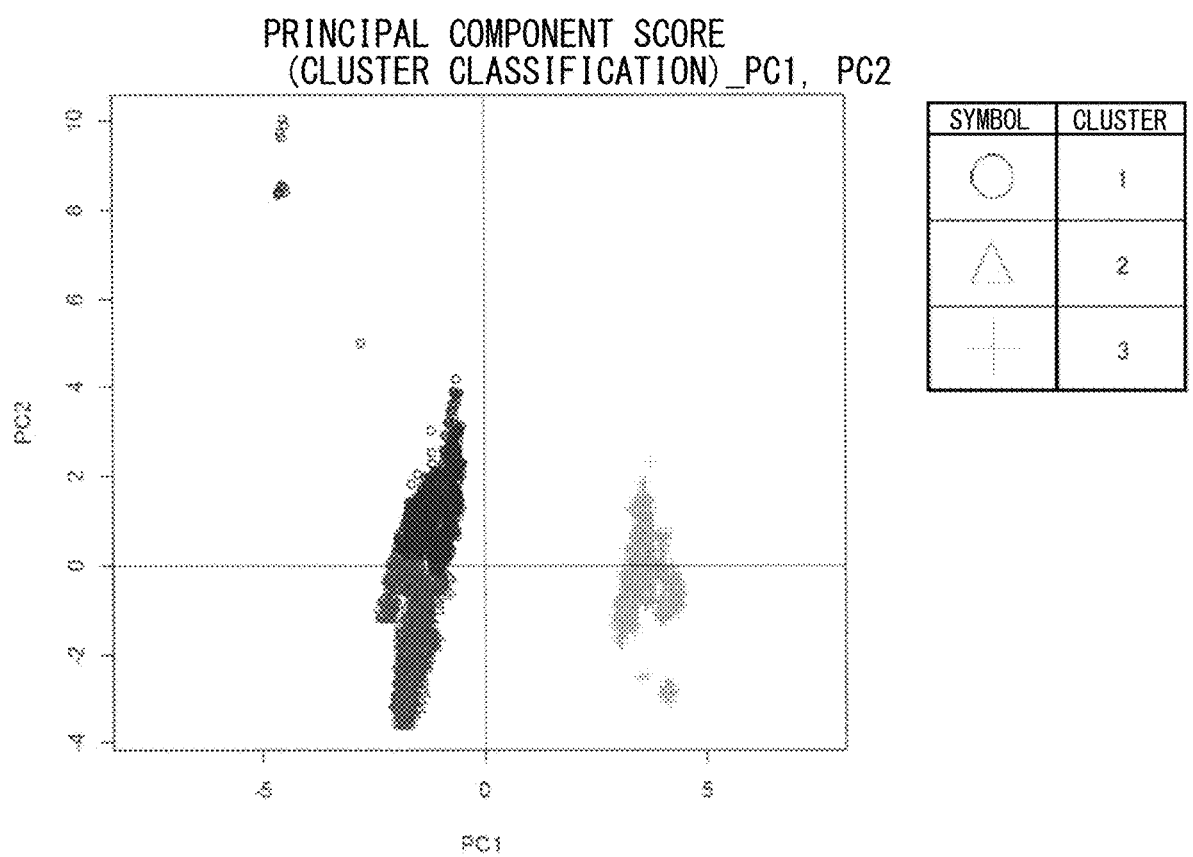
FIG. 10 is a graph showing principal component scores and groups for each of lots in a sixth step.

Specifically, the control device 8 calculates the values of the first principal component PC1, a second principal component PC2, and so on, i.e., the principal component scores, on the basis of the intermediate variables x1, x2, and x3 for each lot and each coefficient in the correlation coefficient matrix. FIG. 5 is a graph in which the principal component scores are plotted in a coordinate system in which the first principal component is represented by the horizontal axis and the second principal component is represented by the vertical axis, for the manufacturing conditions of a first step.

Next, the control device 8 applies cluster analysis to the principal component scores indicated in FIG. 5, and classifies the lots into a plurality of groups (step S4). "Cluster analysis" is a method for classifying data to be analyzed (clusters) into a plurality of groups by focusing on a similarity, and is known as hierarchical clustering, classification-optimized clustering, and so on. The "similarity" that the cluster analysis in this example focuses on is a distance between the principal component scores of different lots. Agglomerative hierarchical clustering, which is one type of hierarchical clustering, is used in this example. Ward's method, which provides stable solutions, is used as the method for calculating the distance between clusters. "Ward's method" selects clusters at which an increase in a deviation square sum when two clusters are merged is minimized. For example, when clusters A and B are merged to generate cluster C, deviation square sums Sa, Sb, and Sc within clusters A, B, and C are expressed as Equations 4 to 6, respectively.

[Math. 4]
$$Sa = \sum_{k=1}^{p} \sum_{i=1}^{n_a} (x_{ki}^A - x_k^{-A})^2 \text{ where } x_k^{-A} = \frac{1}{n_a} \sum_{i=1}^{n_a} x_{ki}^A \tag{4}$$

$x_{ki}^A : i-th$ (1, 2, ..., $n_a$) data at variable $k$ (1, 2, ..., $p$) belonging to cluster $A$

[Math. 5]
$$Sb = \sum_{k=1}^{p} \sum_{i=1}^{n_a} (x_{ki}^B - x_k^{-B})^2 \text{ where } x_k^{-B} = \frac{1}{n_a} \sum_{i=1}^{n_a} x_{ki}^B \tag{5}$$

$x_{ki}^B : i-th$ (1, 2, ..., $n_b$) data at variable $k$ (1, 2, ..., $p$) belonging to cluster $B$

[Math. 6]
$$Sc = \sum_{k=1}^{p} \sum_{i=1}^{n_c} (x_{ki}^C - x_k^{-C})^2 = \sum_{k=1}^{p} \left[ \sum_{i=1}^{n_a} (x_{ki}^A - x_k^{-C})^2 + \sum_{i=1}^{n_b} (x_{ki}^B - x_k^{-C})^2 \right] \tag{6}$$

where $x_k^{-C} = \frac{1}{n_c} \sum_{i=1}^{n_c} x_{ki}^C = \frac{n_a}{n_a + n_b} x_k^{-A} + \frac{n_b}{n_a + n_b} x_k^{-B}$ From Equations 4 to 6, the deviation square sum Sc in cluster C is as follows.

[Math. 7]
$$Sc = Sa + Sb + \Delta Sab \tag{7}$$

where $\Delta Sab = \frac{n_a n_b}{n_a + n_b} \sum_{k=1}^{p} (x_k^{-A} - x_k^{-B})^2$ $\Delta Sab$ in Equation 7 indicates an increment of the deviation square sum when clusters A and B are merged to generate cluster C. As such, the clustering proceeds by selecting and merging clusters so as to minimize $\Delta Sab$ at each stage of the merging.

As illustrated in FIG. 5, in the present embodiment, six groups, i.e., groups 1 to 6, are obtained by classification in a five-dimensional space from first to fifth eigenvectors. Note that groups 1 to 6 correspond to clusters 1 to 6, respectively, in FIG. 5. The number of groups is not limited to six, and may be five or less, or seven or more, as long as the number is easy to handle.

Similarly, the principal component scores are plotted on a graph and classified into a plurality of groups for the second to sixth steps as well. FIGS. 6 to 10 illustrate the principal component scores and groups (clusters) for the manufacturing conditions in the second to sixth steps.

Figure 12:
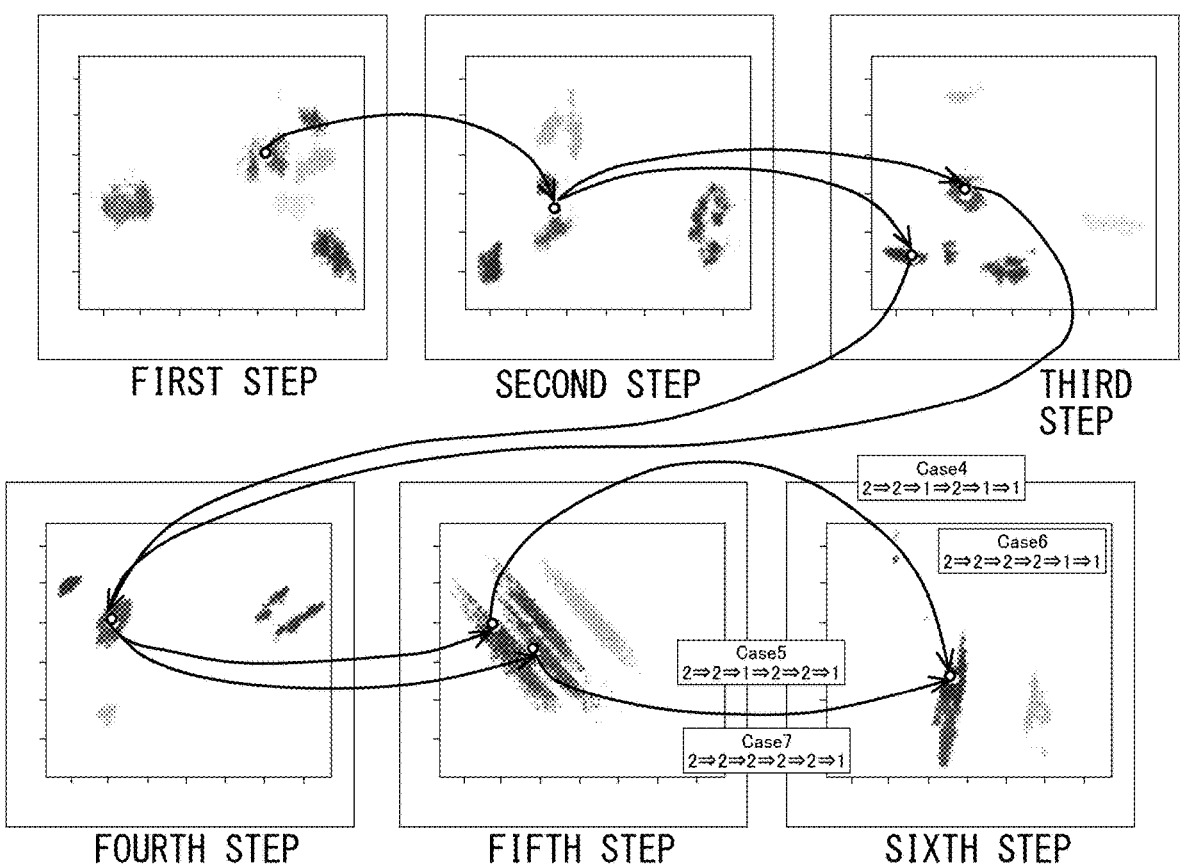
FIG. 12 is a diagram illustrating group combinations in each of steps corresponding to Cases 4 to 7 in FIG. 11.

Next, a process of generating lots is classified into a plurality of routes for each combination of groups in the first to sixth steps (step S5). In the present embodiment, 16 types of routes are found to exist on the basis of past production results, and the process is therefore classified into 16 routes. FIG. 11 illustrates a breakdown of all of the routes. Note that "Case" in FIG. 11 corresponds to the route described above, and the numbers in FIG. 11 correspond to numbers of the groups in the first to sixth steps. Additionally, FIG. 12 illustrates routes corresponding to Cases 4 to 7 as an example of the combination of groups constituting the routes.

Next, a superiority/inferiority of the product data for each route is determined (step S6). In step S6, the control device 8 calls the intermediate variables obtained from the product data (an appearance inspection failure rate and the like) for each lot belonging to Cases 1 to 16 in FIG. 11, and determines the superiority/inferiority of the product data.

Note that the superiority/inferiority of the product data is preferably determined on the basis of an average value within the plurality of lots (lot group) classified by route. Doing so levels out variability of the product data in the lot group within the route, and makes it possible to broadly understand the trend of good or bad product data among the routes.

The superiority/inferiority of the product data may be determines on the basis of the magnitude of deviation, the magnitude of a difference between a maximum value and a minimum value (a range), or the like of the product data in the route, or may be determined by taking a combination of two or more of average values, deviations, or R-values. For determining the superiority/inferiority of the product data using a combination of the average values and the deviations, for example, if the average values within a route are the same, determining the product data having a lower deviation within the route as superior can be considered. This makes it possible to broadly understand the trends in the superiority/inferiority of product data among routes, taking into account variability in the product data within routes.

The control device 8 then compares the product data of each route, and determines the superiority/inferiority thereof. In FIG. 11, the appearance inspection failure rate is evaluated as the product data for each route, in three levels, i.e., excellent, good, and acceptable, in accordance with the superiority/inferiority thereof.

Next, in accordance with the superiority/inferiority of the product data in each route, a suitable combination of groups is identified for the first to sixth steps (step S7). For example, comparing Cases 4 and 5, which are determined to be excellent, with Cases 6 and 7, which are determined to be good, the cases are in the same group in the first, second, fourth, and sixth steps, but are in different groups in the third step. The fifth step is presumed to not have any significant effect on the product data, for either group 1 or 2. In other words, it can be seen that in a route traversing group 2 in the first step and group 2 in the second step, it is preferable to use a combination with group 1 in the third step.

Additionally, comparing Case 14, which is determined to be excellent, with Case 15, which is determined to be good, the cases are in the same group in the first to fourth and sixth steps, but are in different groups in the fifth step. In other words, it can be seen that a combination of group 5 in the first step, group 3 in the second step, group 4 in the third step, group 2 in the fourth step, group 1 in the fifth step, and group 1 in the sixth step is preferable. Note that "suitable combination" in the present embodiment means a combination that contributes to the improvement of the product data, and is not intended to be only the combination providing the best product data.

When the manufacturing conditions for each step are set on the basis of the combination selected in step S7, it is preferable to set the average values of the process data of each group as the initial values for the manufacturing conditions, and then make fine adjustments to the manufacturing conditions while confirming the quality of the product data at that time. By setting the average values of the process data as the initial values, preferred combinations of groups for the first to sixth steps can be reproduced without deviating from past states, i.e., without placing an excessive load on manufacturing equipment and the like.

<Main Operation Stage>

Processing by the control device 8, performed on the basis of the basic information obtained in the foregoing preparation stage, will be described next.

In the continuous production system 1, when a powder raw material is input to the mixer 2, the raw material powder, liquid, or the like is mixed in the mixer 2, after which processing for binding the raw material mixed in the mixer 2 into small particles to form a granular shape is performed in the granulator 3. The raw material which has been granulated in the granulator 3 is dried in the dryer 4, and the raw material which has been dried in the dryer 4 is then mixed in the mixer 5. The tablet press 6 then performs processing for compressing the raw material mixed in the mixer 5 into a tablet, after which the coating machine 7 performs processing for coating the tablet. The control device 8 changes the control target values of each device, performs processing for switching the valves provided partway along the paths, and the like so that the series of devices, from the mixer 2 to the coating machine 7, operate properly. At this time, the control device 8 changes the control target values of each device, performs the processing for switching the valves provided partway along the paths, and the like on the basis of the basic information obtained in the foregoing preparation stage.

Figure 13:
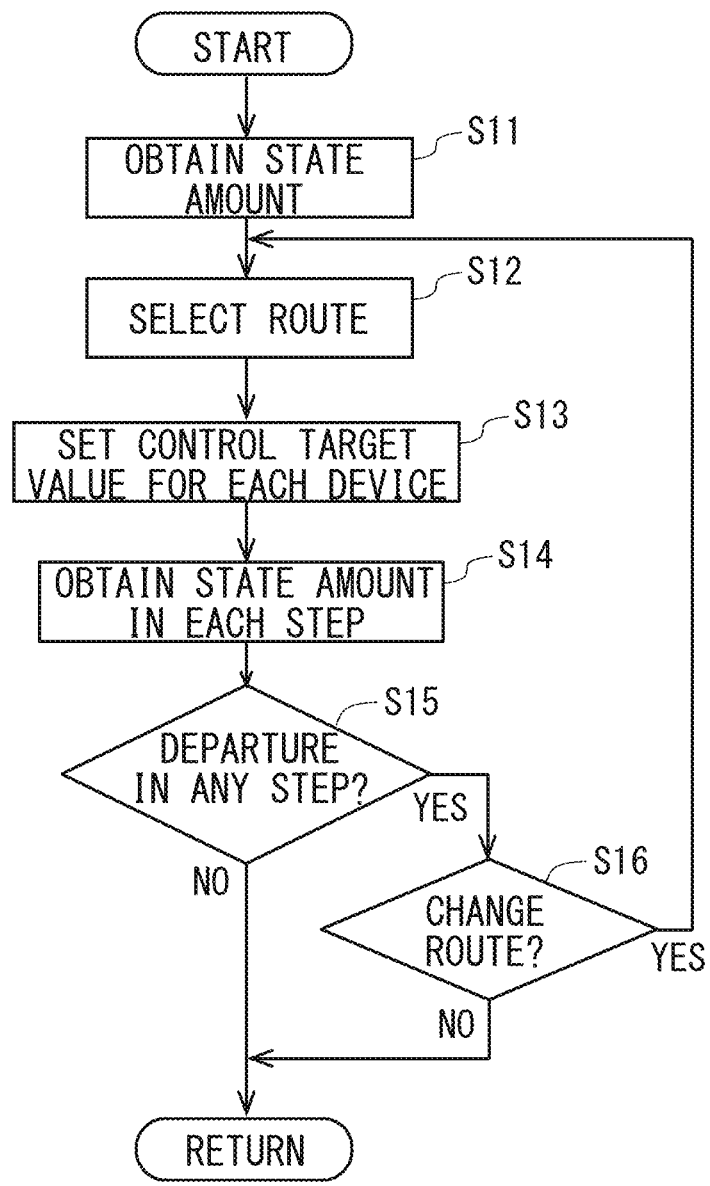
FIG. 13 is a diagram illustrating an example of processing performed by a control device.

FIG. 13 is a diagram illustrating an example of the processing performed by control device 8. When each device in the continuous production system 1 operates, the control device 8 executes the processing flow illustrated in FIG. 13. In other words, when each device in the continuous production system 1 operates, the control device 8 obtains information of the current manufacturing conditions of each step (S11). Then, the control device 8 selects one route among the plurality of routes created in the preparation stage (S12). The route selection is performed on the basis of the obtained information of the current manufacturing conditions. In the continuous production system 1, the mixer 2 handles the first step in the process implemented by the continuous production system 1, and thus the control device 8 selects the route on the basis of information of the current manufacturing conditions obtained from the mixer 2.

For example, when the 16 routes illustrated in FIG. 11 have been prepared in the preparation stage, and the manufacturing conditions obtained from the mixer 2, which handles the first step, belong to group 5, the control device 8 selects, from the two routes which can be employed in group 5 (Cases 14 and 15), Case 14, which provides a comparatively better quality for the final product.

Then, after the route has been selected, the control device 8 sets the control target values for each device in the continuous production system 1 so that the manufacturing conditions adhere to the selected route (S13). As a result of the control device 8 setting the control target values for each device, each device in the continuous production system 1 operates according to the control target values set by the control device 8.

For example, when the route of Case 14 has been selected in step S12, the control device 8 sets the control target values for each device in step S13 so that the control target values of each device in the continuous production system 1 that handle the respective steps become default manufacturing conditions of each of the steps when following Case 14 illustrated in FIG. 11. Through this, each device in the continuous production system 1 operates according to the control target values set by the control device 8. Then, in the absence of any particular anomalies, each lot will follow the default manufacturing conditions as indicated by the specific routes illustrated in FIG. 12.

To monitor that each lot is following a planned route without any particular anomalies occurring, the control device 8 performs processing for obtaining the current manufacturing conditions in each step (S14), and processing for determining whether or not the obtained current manufacturing conditions conform to the default manufacturing conditions for the route selected in step S12 (S15). If a negative determination has been made in step S15, the control device 8 executes processing for determining whether or not to change the route selected in step S12 (S16).

Note that the determination processing of step S15 may be performed, for example, by having permissible manufacturing condition differences set for each of the default manufacturing conditions for each route illustrated in FIG. 12, and determining whether or not the current manufacturing conditions obtained in step S14 are within a difference range; or, by providing default upper limit values and lower limit values in advance for the default manufacturing conditions for each route illustrated in FIG. 12, and determining whether or not the current manufacturing conditions obtained in step S14 are between the upper limit value and the lower limit value.

Additionally, the determination processing of step S16 may be performed, for example, by notifying an operator that the current manufacturing conditions deviate from the route, and requesting that the operator determine whether or not to change the route; or, by the control device 8 referring to information of the plurality of routes as illustrated in FIG. 12, and determining whether or not there is a substitute route which is different from the route selected in step S12.

By having the control device 8 execute the above-described series of processing while each device in the continuous production system 1 is operating, each lot is processed so as to follow the manufacturing conditions of several routes which have already been confirmed, on the basis of past production results, to be capable of maintaining quality. In other words, in the continuous production system 1, optimal control target values based on past production results are set in accordance with the current manufacturing state as a result of the control device 8 executing the above-described processing. Accordingly, product quality can be stabilized more than, for example, a case where fixed control target values are set uniformly for each device, regardless of the manufacturing state, as has been done conventionally.

Note that because the continuous production system 1 is a system that continuously produces medicinal tablets from a powder raw material, when a positive determination has been made in step S15, processing for preventing the corresponding lot from flowing to the next step may be performed. The processing for preventing a specific lot from flowing to the next step can be realized, for example, by using the inspection and sorting device 10, which is disposed at an appropriate location of the continuous production system 1, in the manner described below. An example of an overall control flow which can be implemented by the continuous production system 1 when the inspection and sorting device 10 is provided at the location indicated by the letter C in FIG. 1 will be described below.

The dryer 4 of the continuous production system 1 illustrated in FIG. 1 adds various types of additional raw materials to the raw material granulated by the granulator 3 and dries the raw materials. The dryer 4 is provided with at least one heater for heat-based drying, and the amount by which the heater is electrified is adjusted by the control device 8 to achieve an appropriate drying temperature. The dryer 4 is also provided with a variable-speed blower, and a rotational speed of the blower is adjusted by the control device 8 so that the raw material granulated by the granulator 3 travels through the dryer 4 at an appropriate speed.

Here, when the above-described inspection and sorting device 10 is installed partway along the path connecting the dryer 4 with the mixer 5, i.e., at the area indicated by the letter C in FIG. 1, if the manufacturing conditions of the dryer 4 have deviated from the route, the continuously-processed raw material can be prevented from flowing to the mixer 5, which handles the next step. This makes it possible to move that raw material to a device aside from the mixer 5 and perform the appropriate processing, or discharge the raw material to the exterior of the continuous production system 1.

<Variations>

A variation on the foregoing embodiment will be described next. In the foregoing embodiment, the route selection in the main operation stage is performed using the information of the manufacturing conditions obtained from the mixer 2 which handles the first step. However, the continuous production system 1 may select the route on the basis of, for example, the properties of the raw material. The present variation will be described in detail hereinafter.

The hardware configuration of the present variation is basically the same as that of the continuous production system 1 in the foregoing embodiment. As such, the descriptions will use the same reference signs as with the continuous production system 1 of the foregoing embodiment, and the various devices will not be described in detail. Additionally, like the foregoing embodiment, although the present variation will describe a case where a product is continuously produced from a powder of a raw material as an example, the present embodiment can also be applied to a batch system in which the raw material is intermittently moved between devices that handle each step using a receptacle or the like. Additionally, although the present variation will describe producing a medicine as an example, the present embodiment can also be applied in the production of food products and other types of products, for example.

<Processing Flow>

The details of operations by the continuous production system 1, implemented by the control device 8, according to the present variation will be described next. As in the foregoing embodiment, in the present variation, the descriptions of the details of the operations of the continuous production system 1, realized by the control device 8, are broadly divided into details of a preparation stage, and details of a main operation stage. Accordingly, the details of the preparation stage will be described first, after which the details of the main operation stage will be described.

<Preparation Stage>

A sequence of an analysis method in a production process according to the present variation will be described with reference to the flowchart in FIG. 4.

As in the foregoing embodiment, first, the control device 8 collects information of manufacturing conditions (process data and product data) for a production process which has already been run (step S1). Although information of the manufacturing conditions measured by sensors was collected at this time in the foregoing embodiment, in the present variation, raw material data (the properties, composition, and so on of the raw material) is also collected, in addition to the process data measured by the sensors. The raw material data is supplied by the manufacturer of the raw material, for example.

Then, as in the foregoing embodiment, the control device 8 according to the present variation performs the processing for standardizing the data (step S2), the processing for finding the principal component load amounts and principal component scores on the basis of the intermediate variables (step S3), the processing for classifying the lots into a plurality of groups (step S4), processing for classifying the process of generating lots into a plurality of routes for each of combinations of groups (step S5), processing for determining the superiority/inferiority of the product data for each route (step S6), and processing for specifying a suitable combination of the groups (step S7).

For example, in step S2, the processing for standardizing the data based on the aforementioned Equation 1 is performed. In step S3, the correlation coefficient matrix for the intermediate variables is created, and the eigenvalues and eigenvectors of the correlation coefficient matrix are derived, after which the principal component scores are found from the eigenvectors of the correlation coefficient matrix, and the percent contributions of the principal components are found from the eigenvalues of the correlation coefficient matrix. In step S4, cluster analysis is applied to the principal component scores, and processing for classifying each lot into a plurality of groups is performed. Then, after the processing of step S5, in step S6, the intermediate variables obtained from the product data (the appearance inspection failure rate and the like) are called for each lot, and the superiority/inferiority of the product data is determined for each route by determining the superiority/inferiority of the product data. Additionally, in step S7, a combination of groups for each step which provides a comparatively good quality is specified by comparing the superiority/inferiority of the product data for each route.

FIG. 14 is a diagram illustrating an example of raw materials classified into a plurality of groups by properties. With various types of raw materials such as powders, even if the raw materials are the same product purchased from a specific manufacturer, there will be some variability in properties from lot to lot, as illustrated in FIG. 14. Accordingly, in the present variation, information pertaining to the properties of the raw material is incorporated into the analysis of the production process as raw material data. As such, analysis of the production process based on past production results may, depending on the raw material properties, lead to several routes with relatively good quality for the final product.

Figure 15:
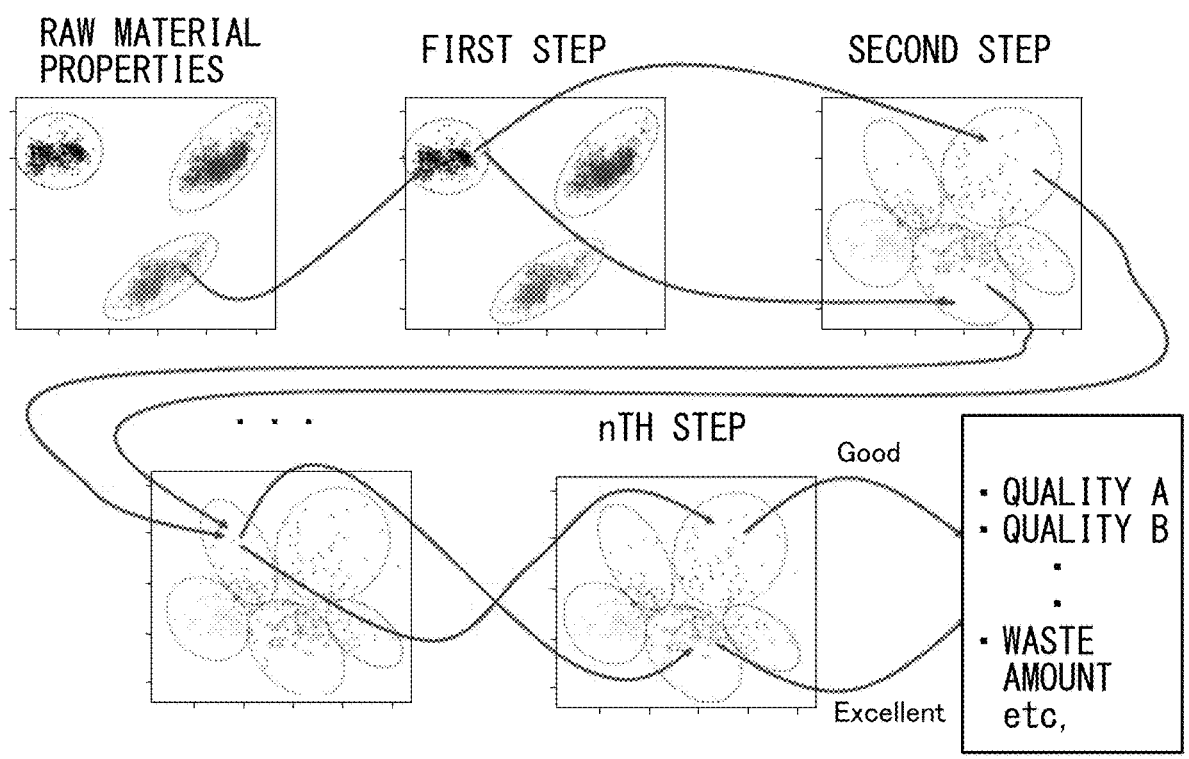
FIG. 15 is a diagram illustrating an example of a route which emerges when raw material data has been loaded in analysis of a production process.

FIG. 15 is a diagram illustrating an example of a route which emerges when the raw material data has been loaded in the analysis of the production process. Various types of raw materials, such as powders, have some variability in properties depending on the lot, and thus when the principal component scores are found by standardizing the raw material data and converting the data into intermediate variables, the variability in raw material properties appears on a graph, as indicated in the "raw material properties" graph of FIG. 15, which plots the principal component scores. In the present variation, processing is performed for applying cluster analysis to the principal component scores, which indicate the variability of the raw material properties, and classifying the raw materials into a plurality of groups.

In addition to the processing for classifying the raw materials into a plurality of groups, in the present variation, processing is also performed for classifying the principal component scores into a plurality of groups for each step. Several graphs shown in FIG. 15, from "first step" to "nth step", are graphs showing principal component scores and groups (clusters) for the manufacturing conditions in each step.

Then, in the present variation, after the processing for classifying the process of generating lots into a plurality of routes for each combination of raw material properties and each group for the steps has been performed, the superiority/inferiority of the product data is determined for each route, and several routes starting from the raw material properties are extracted, as illustrated in FIG. 15.

<Main Operation Stage>

Processing by the control device 8 according to the present variation, performed on the basis of the basic information obtained in the foregoing preparation stage, will be described next. Note that the processing performed by the control device 8 in the present variation is basically the same as in the foregoing embodiment, and thus the descriptions will focus on the differences from the foregoing embodiment.

Figure 16:
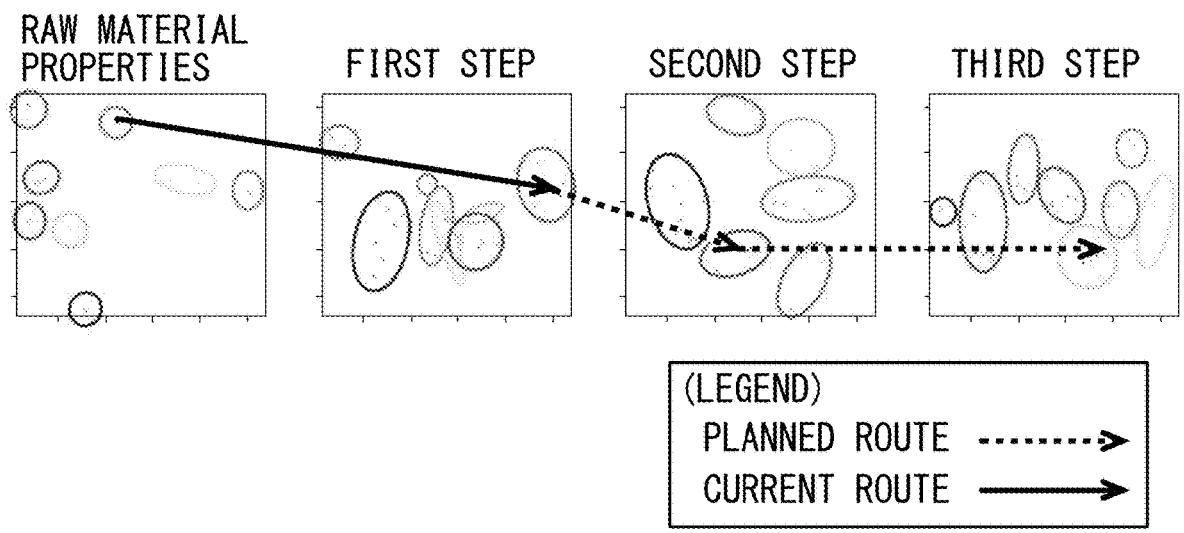
FIG. 16 is a diagram illustrating a specific lot following a planned route.

When each device in the continuous production system 1 operates, the control device 8 according to the present variation executes a processing flow similar to that illustrated in FIG. 13. In other words, when each device in the continuous production system 1 operates, the control device 8 obtains the manufacturing conditions (S11). At this time, the control device 8 obtains the raw material data as the manufacturing conditions. The raw material data is input by an operator, for example. Then, the control device 8 selects one route among the plurality of routes created in the preparation stage (S12). The route is selected on the basis of the obtained raw material data. Then, after the route has been selected, the control device 8 sets the control target values for each device in the continuous production system 1 so that the manufacturing conditions adhere to the selected route (S13). As a result, each device in the continuous production system 1 operates in accordance with the control target values set by the control device 8, and if there are no particular anomalies, the current lot will follow the selected planned route, as illustrated in FIG. 16. The confirmation that the current lot is following the selected planned route is performed through processing for obtaining information pertaining to the current manufacturing conditions in each step (S14), and processing for determining whether or not the obtained current manufacturing conditions conform to the default manufacturing conditions for the route selected in step S12 (S15).

Figure 17:
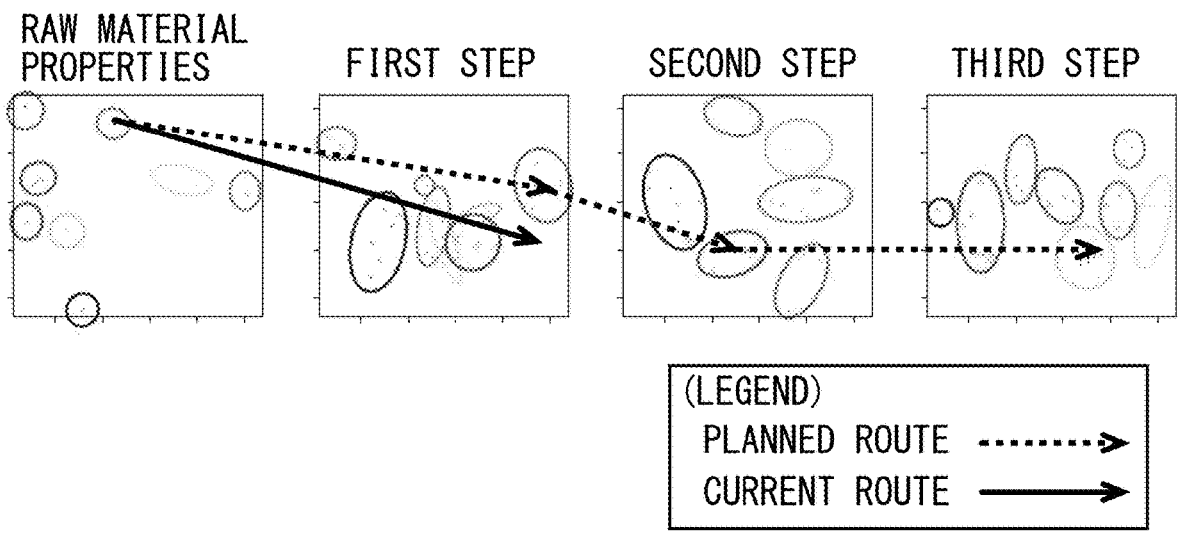
FIG. 17 is a diagram illustrating a specific lot departing from a planned route.

Here, if, as illustrated in FIG. 17, the current lot deviates from the selected planned route, a negative determination is made in step S15. The process of determining whether or not to change the route selected in step S12 (S16) is then executed.

By having the control device 8 according to the present variation execute the above-described series of processing while each device in the continuous production system 1 is operating, in accordance with the properties of the raw materials input to the continuous production system 1, each lot is processed so as to follow the manufacturing conditions of several routes which have already been confirmed, on the basis of past production results, to be capable of maintaining quality. Accordingly, product quality can be stabilized more than, for example, a case where fixed control target values are set uniformly for each device, regardless of the raw material properties, the manufacturing state, and so on.

Note that the processing for preventing a specific lot from flowing to the next step can be applied to the present variation in the same manner as described in the foregoing embodiment.

DESCRIPTION OF THE REFERENCE NUMERALS AND SYMBOLS

1 Continuous production system
2 Mixer
3 Granulator
4 Dryer
5 Mixer
6 Tablet press
7 Coating machine
8 Control device
10 Inspection and sorting device
11 Inflow path
12 Entry-side sluice valve
13 Air blowing channel
14 Sight glass
15, 24 Laser sensor
16 Inspection chamber
17 Spectral analyzer
18 Exit-side sluice valve
19, 20 Valve hole
21 Path changeover valve
22, 23 Outflow path

What is claimed is:

1. A production system producing a product from a raw material by a production process having a plurality of steps, the system comprising:
a plurality of production apparatuses that handle the steps in which powders of the raw material continuously flow in sequence;
a memory;
a central processor connected to the memory,
wherein the central processor:
obtains information of a manufacturing condition indicating a state of at least any step among the plurality of steps;
refers to information of a combination of groups of the steps specified in accordance with a superiority/inferiority of a route pertaining to the manufacturing conditions including a process data and/or a product data, wherein the superiority/inferiority is determined on the basis of the process data and/or the product data of each of lots classified according to each of combinations of steps in a plurality of the groups which have been classified according to each of manufacturing conditions in each of the steps, the route being a route that is followed when each of the lots passes through the production process;
determines a new control target value set for at least any of the plurality of production apparatuses in which raw materials are continuously flowing so that the manufacturing conditions of a route that is selected based on the determined superiority/inferiority and the obtained property of the raw material input conform with a default manufacturing condition for the route; and
sets the new control target value for the production apparatuses,
wherein the information of the manufacturing condition is an information pertaining to an operation state of the plurality of production apparatuses.

2. The production system according to claim 1, wherein the central processor determines the new control target value set for at least any of the plurality of production apparatuses by referring to information of any combination, in which at least a condition of a product quality is satisfied, among the combinations of groups.

3. The production system according to claim 1, wherein the central processor sets the new control target value in at least any of the plurality of production apparatuses.

4. The production system according to claim 1, wherein in a state in which the product has been produced in the production process, upon obtaining information of a manufacturing condition indicating a state of at least any step among the plurality of steps, the central processor determines, on the basis of the obtained information, whether or not a lot of the product meets the manufacturing conditions of the route.

5. The production system according to claim 1, wherein the information of the combination is, with data that includes a manufacturing condition that indicates a state of each of the steps and a quality item that indicates a quality of the product being collected for each lot in the production process, and the steps being classified into a plurality of groups in accordance with manufacturing conditions of the steps, and moreover the lots being classified into a plurality of routes for each combination of groups, and furthermore a superiority/inferiority of each of the routes being determined in accordance with the quality item of each of the routes, information of a favorable combination of the groups specified in accordance with the superiority/inferiority of each of the routes.

6. The production system according to claim 1, wherein the production process is a continuous production process that continuously produces a product from a powder, which is a material,
the plurality of production apparatuses include a first processor that performs first processing on the powder, which is a raw material, a second processor that performs second processing on the powder, on which the first processor has performed the first processing, and an inspection and sorting device having an inspection chamber, into which the powder sent from the first processor flows,
the inspection and sorting device is a device that, when a prescribed amount of the powder has accumulated in the inspection chamber, inspects the powder inside the inspection chamber after blocking a path connecting the first processor to the inspection chamber, and when the inspection ends, discharges the powder from within the inspection chamber and then cancels the blocking, and when the inspection and sorting device obtains information of a property of the powder within the inspection chamber, the central processor determines a control target value set in the second processor by referring to the information of the combination.

7. The production system according to claim 6, wherein in a case where the powder within the inspection chamber is not classified into any of the groups as a result of referring to the information of the combination, the central processor does not cause the inspection and sorting device to discharge the powder from within the inspection chamber to the second processor.

8. A production method for producing a product from a raw material by a production process having a plurality of steps, the method comprising:
   a step of operating a plurality of production apparatuses that handle the steps in which powders of the raw material continuously flow in sequence; and
   a step of causing a central processor to determine a control target value set for each of the plurality of production apparatuses,
   wherein the step of causing the central processor comprises:
   obtaining information of a manufacturing condition indicating a state of at least any step among the plurality of steps,
   referring to information of a combination of groups of the steps specified in accordance with a superiority/inferiority of a route pertaining to manufacturing conditions including a process data and/or a product data, wherein the superiority/inferiority is determined on the basis of the process data and/or product data of each of lots classified according to each of combinations of steps in a plurality of the groups which have been classified according to each of the manufacturing conditions in each of the steps, the route being a route of manufacturing conditions that is followed when each of the lots passes through the production process
   determining a new control target value set for at least any of the plurality of production apparatuses in which raw materials are continuously flowing so that the manufacturing conditions of a route that is selected based on the determined superiority/inferiority and the obtained property of the raw material input conform with a default manufacturing condition for the route; and
   setting the new control target value for the production apparatuses,
   wherein the information of the manufacturing condition is an information pertaining to an operation state of the plurality of production apparatuses.

9. A central processor of a production system producing a product from a raw material by a production process having a plurality of steps in which powders of the raw material continuously flow in sequence, the central processor:
   determines a new control target value set for each of a plurality of production apparatuses that handle the steps; and
   outputs the new control target value,
   wherein the central processor obtains information of a manufacturing condition indicating a state of at least any step among the plurality of steps, refers to information of a combination of groups of the steps specified in accordance with a superiority/inferiority of a route pertaining to manufacturing conditions including a process data and/or a product data, wherein the superiority/inferiority is determined on the basis of the process data and/or the product data of each of lots classified according to each of combinations of steps in a plurality of the groups which have been classified according to each of the manufacturing conditions in each of the steps, the route being a route of manufacturing conditions that is followed when each of the lots passes through the production process, determines a new control target value set for at least any of the plurality of production apparatuses in which raw materials are continuously flowing so that the manufacturing conditions of a route that is selected based on the determined superiority/inferiority and the obtained property of the raw material input conform with a default manufacturing condition for the route; and sets the new control target value for the production apparatuses,
   wherein the information of the manufacturing condition is an information pertaining to an operation state of the plurality of production apparatuses.

* * * * *